(12) United States Patent
Kawashima

(10) Patent No.: US 9,744,889 B2
(45) Date of Patent: Aug. 29, 2017

(54) VEHICLE AIR-CONDITIONING SYSTEM PROVIDED WITH SEAT AIR-CONDITIONING UNIT

(75) Inventor: Masafumi Kawashima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 1015 days.

(21) Appl. No.: 13/366,766

(22) Filed: Feb. 6, 2012

(65) Prior Publication Data

US 2012/0202413 A1 Aug. 9, 2012

(30) Foreign Application Priority Data

Feb. 8, 2011 (JP) .................................. 2011-024865

(51) Int. Cl.
B60N 2/56 (2006.01)
B60H 1/00 (2006.01)

(52) U.S. Cl.
CPC ....... *B60N 2/5635* (2013.01); *B60H 1/00285* (2013.01); *B60H 1/00764* (2013.01); *B60N 2/5657* (2013.01); *B60H 1/00* (2013.01)

(58) Field of Classification Search
CPC .............................. B60H 1/00764; B60H 1/00
USPC .................................. 62/133, 244; 165/186
See application file for complete search history.

(56) References Cited

U.S. PATENT DOCUMENTS

| | | | | |
|---|---|---|---|---|
| 5,058,388 A | * | 10/1991 | Shaw ...................... | F24F 3/044 62/176.6 |
| 5,511,724 A | * | 4/1996 | Freiberger et al. .......... | 236/49.3 |
| 5,921,100 A | * | 7/1999 | Yoshinori et al. .............. | 62/244 |
| 6,059,018 A | * | 5/2000 | Yoshinori et al. .............. | 165/42 |
| 6,079,485 A | * | 6/2000 | Esaki et al. ..................... | 165/43 |
| 6,105,667 A | * | 8/2000 | Yoshinori et al. ............ | 165/202 |
| 6,178,760 B1 | * | 1/2001 | Tanaka et al. .................. | 62/154 |
| 6,871,696 B2 | * | 3/2005 | Aoki et al. ...................... | 165/43 |

(Continued)

FOREIGN PATENT DOCUMENTS

| | | |
|---|---|---|
| JP | 05-058141 | 3/1993 |
| JP | 2000-094942 | 4/2000 |

(Continued)

OTHER PUBLICATIONS

Office Action issued Feb. 4, 2014 in corresponding JP Application No. 2011-024865 (with English translation).

*Primary Examiner* — Justin Jonaitis
*Assistant Examiner* — Joel Attey
(74) *Attorney, Agent, or Firm* — Harness, Dickey & Pierce, P.L.C.

(57) ABSTRACT

An air-conditioning system includes a vehicle air-conditioner which uses a target blowing-out temperature as the basis to control an air outlet temperature in a cabin and a seat air-conditioning unit which sucks recirculated air into a seat. The air-conditioning system controls at least the seat air-conditioning air flow per unit time so as to perform seat air-conditioning. The air-conditioning system increases the seat air-conditioning air flow when detecting that the vehicle speed is stopped or idling, calculates a correction amount for the target blowing-out temperature considered neutral in warmness sense level for the increased seat air-conditioning air flow, and uses the correction amount as the basis to correct the target blowing-out temperature.

13 Claims, 7 Drawing Sheets

(56) References Cited

U.S. PATENT DOCUMENTS

| | | | |
|---|---|---|---|
| 2001/0022222 A1* | 9/2001 | Aoki | B60H 1/00285 165/203 |
| 2004/0083745 A1* | 5/2004 | Tomita et al. | 62/161 |
| 2004/0139754 A1* | 7/2004 | Kamiya et al. | 62/186 |
| 2006/0042788 A1* | 3/2006 | Naruse et al. | 165/202 |
| 2006/0060344 A1* | 3/2006 | Esaki | 165/287 |
| 2007/0095378 A1* | 5/2007 | Ito et al. | 136/203 |
| 2007/0193279 A1* | 8/2007 | Yoneno et al. | 62/3.3 |
| 2009/0031742 A1* | 2/2009 | Seo et al. | 62/244 |
| 2009/0145141 A1* | 6/2009 | Akahoshi | B60H 1/004 62/133 |
| 2010/0314071 A1* | 12/2010 | Lee et al. | 165/59 |

FOREIGN PATENT DOCUMENTS

| | | |
|---|---|---|
| JP | 2000-142095 | 5/2000 |
| JP | 2004-148949 | 5/2004 |
| JP | 2006-076398 | 3/2006 |
| JP | 2006-082641 | 3/2006 |
| JP | 2010-23695 | 2/2010 |

\* cited by examiner

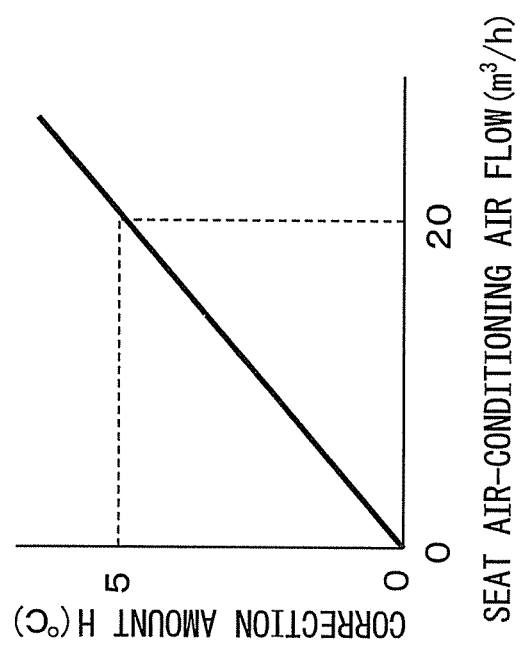
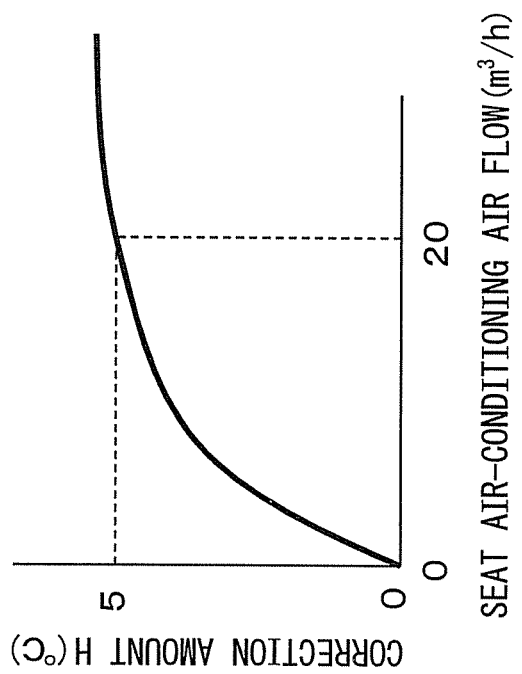

EXAMPLE OF
TARGET EVAPORATOR OUTLET TEMPERATURE

VEHICLE AIR-CONDITIONING SYSTEM PROVIDED WITH SEAT AIR-CONDITIONING UNIT

BACKGROUND OF THE INVENTION

1. Field of the Invention

The present invention relates to a vehicle air-conditioning system in a conventional vehicle which controls a seat air-conditioning unit so as to reduce the amount of fuel consumption at the time the vehicle is stopped etc.

2. Description of the Related Art

Due to the rising need for conserving energy, the drop in fuel economy due to air-conditioner use at the time of idling has been surfacing as an issue. To counter the drop in fuel economy at the time of idling, raising the evaporator temperature etc. may be considered as countermeasures, but simply raising the evaporator temperature of the air-conditioning system detracts from the passengers' feeling of comfort, so is not preferable. Note that, general air-conditioning systems are described in detail in Japanese Unexamined Patent Publication No. 2006-76398, Automotive Air Conditioning, Tokyo Denki University Press, Kenichi Fujiwara et al., Sep. 20, 2009, pp. 88 to 94, etc.

As related art to deal with this issue, Japanese Unexamined Patent Publication No. 2000-142095 may be mentioned. In this art, hybrid cars or cars mounting economic running systems (cars with idling stop systems) are adjusted in seat air-conditioning ability and compartment air-conditioning ability so as to increase the engine stop time at times other than ordinary operation and thereby save energy.

As opposed to this, in conventional vehicles, the engines have no automatic stop, so art such as in Japanese Unexamined Patent Publication No. 2000-142095 cannot be used. In conventional vehicles, to maintain the cooling ability of the vehicle air-conditioner while the engine is stopped (and while it is idling), it is necessary to operate the compressor of the refrigeration cycle during that period. Usually the engine turning force is used to drive the rotation of the compressor, so to operate the compressor at the time of idling, it is necessary to raise the engine speed so that the engine does not stop ("idling up control"). As a result, the problem arises that when the air-conditioning is on, compared with when the air-conditioning is off, the amount of fuel consumption ends up increasing.

SUMMARY OF INVENTION

The present invention was made in view of the above problem and has as its object to reduce the amount of fuel consumption at times in conventional vehicles other than when the vehicle is being driven (such as at the time of idling).

To solve the above problem, the aspect of the invention of claim 1 comprises an air-conditioning system comprising a vehicle air-conditioner which uses a target blowing-out temperature (target air outlet temperature) as the basis to control an air outlet temperature and with a seat air-conditioning unit which sucks recirculated air into a seat and controls at least the seat air-conditioning air flow per unit time so as to perform seat air-conditioning, wherein the air-conditioning system increases the seat air-conditioning air flow when detecting that the vehicle speed is a predetermined value or less, calculates a correction amount for the target blowing-out temperature considered neutral in warmness sense level for the increased seat air-conditioning air flow, and uses the correction amount as the basis to correct the target blowing-out temperature.

Due to this, in a conventional vehicle, there is less of a need for "idling up control" at the time of idling and it is possible to reduce the amount of fuel consumption at times other than normal driving (at the time the vehicle is stopped or at the time of slow operation when the vehicle speed is a predetermined value A or less).

The aspect of the invention of claim 2 provides the aspect of the invention of claim 1 characterized in that the vehicle air-conditioner of the air-conditioning system has at least an evaporator, air mix door, HVAC unit which has a heater core, and refrigeration cycle device which operates a compressor to supply the evaporator with low temperature refrigerant and in that the system calculates a target evaporator outlet temperature of the evaporator from the target blowing-out temperature which has been corrected based on the correction amount so as to thereby reduce the compressor operating rate. Due to this, an advantageous effect similar to the aspect of the invention of claim 1 further arises.

The aspect of the invention of claim 3 provides the aspect of the invention of claim 1 characterized by calculating the correction amount by a map or calculation formula. Due to this, it is possible to quickly and accurately calculate the correction amount. The effect of increase of the air outlet temperature changes according to the vehicle environment, so it is possible to set effects of a plurality of conditions in advance in the map and selectively use them in accordance with input from sensors of the vehicle air-conditioner.

The aspect of the invention of claim 4 comprises the aspect of the invention as set forth in claim 1, characterized by calculating a correction amount based on an identical warmness sense level line comprised of target blowing-out temperatures giving the same warmness sense level for the increased seat air-conditioning air flow. Due to this, it is possible to reduce the amount of fuel consumption and further improve the feeling of comfort of the passengers.

The aspect of the invention of claim 5 comprises the aspect of the invention as set forth in claim 4 characterized by selecting an identical warmness sense level line of a higher temperature to thereby calculate the correction amount so that the correction amount becomes larger than the above identical warmness sense level line. Since fuel economy is given priority to and a larger correction amount is set than the above identical warmness sense level line, it is possible to reduce the amount of fuel consumption more.

The aspect of the invention of claim 6 comprises the aspect of the invention as set forth in claim 1 characterized in that the seat air-conditioning unit further comprises a switch for turning operation on and off and, when the switch is set at off and it is detected that the vehicle speed is a predetermined value or less, the system forcibly operates the seat air-conditioning unit and uses the correction amount as the basis to correct the target blowing-out temperature. Due to this, even if the seat air-conditioning unit is off, it is possible to obtain an advantageous effect which is similar to the aspect of the invention of claim 1.

The aspect of the invention of claim 7 comprises the aspect of the invention of claim 6 characterized in that the switch is provided with switch positions for setting the seat air-conditioning air flow in stages and, when the switch position sets the seat air-conditioning air flow to a maximum air flow or less and the system detects the vehicle speed is a predetermined value or less, the system forcibly makes the seat air-conditioning air flow the maximum air flow and uses the correction amount as the basis to correct the target blowing-out temperature. Due to this, by simple control, it is possible to obtain advantageous effects similar to the aspect of the invention of claim 1.

The aspect of the invention of claim 8 comprises the aspect of the invention as set forth in claim 1 characterized by providing the seat air-conditioning unit with a heat exchanger.

The aspect of the invention of claim 9 comprises the aspect of the invention as set forth in claim 1 characterized in that the seat air-conditioning unit blows air to a passenger who is seated at a seat by blowing out or sucking in air.

The present invention may be more fully understood from the description of preferred embodiments of the invention, as set forth below, together with the accompanying drawings.

BRIEF DESCRIPTION OF THE DRAWINGS

FIG. 4A and FIG. 4B are views which show the relationship between a seat air-conditioning air flow and a correction amount H.

FIG. 5A is a view summarizing air outlet temperature control, while

DESCRIPTION OF THE PREFERRED EMBODIMENTS

Figure 1:
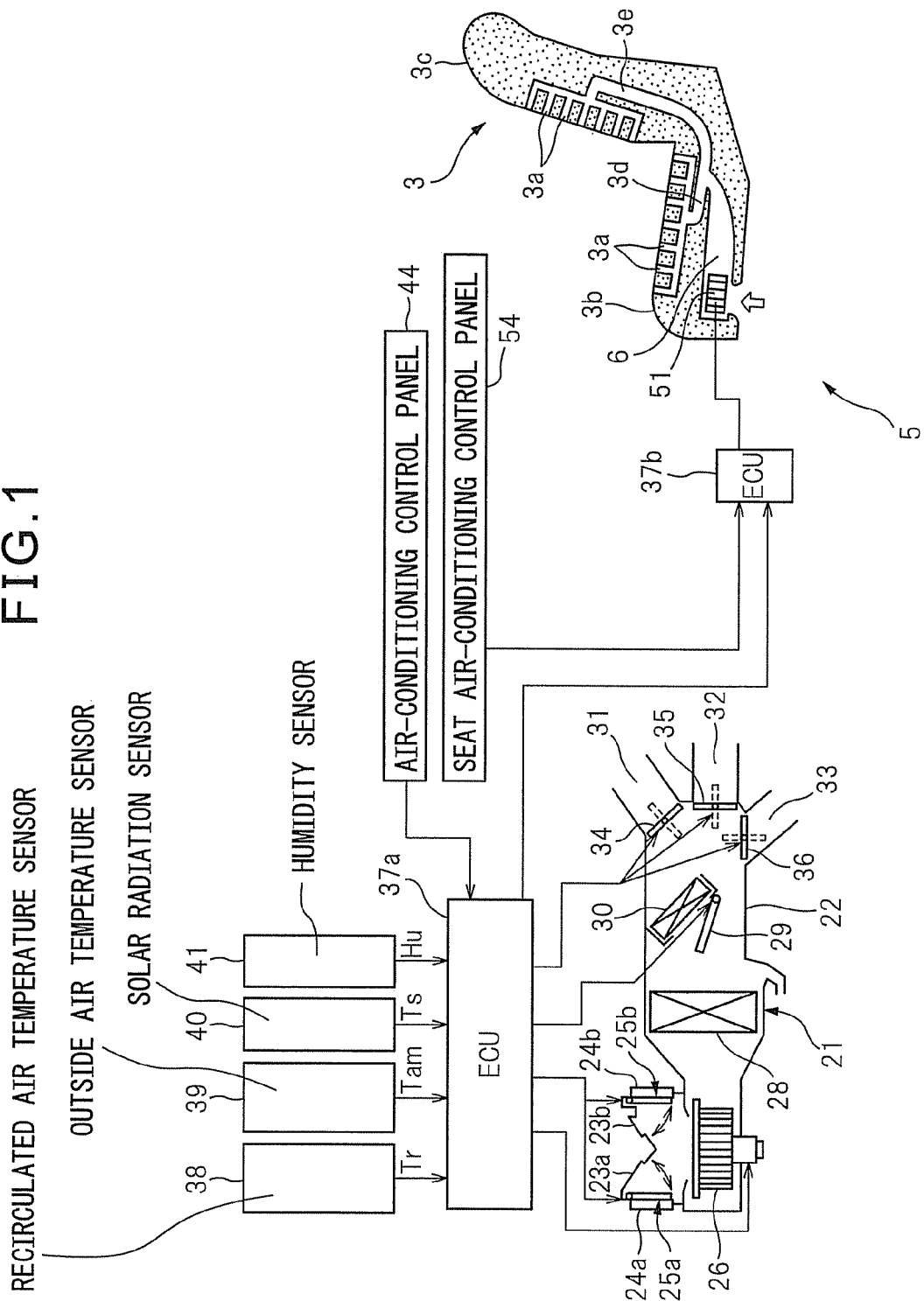
FIG. 1 is a schematic view which shows an overall configuration of a vehicle air-conditioner and a seat air-conditioning unit of one example to which the present invention is applied.

Below, referring to the drawings, embodiments of the present invention will be explained. In the embodiments, parts of the same constitutions will be assigned the same reference signs and their explanations will be omitted. Parts of the same constitutions as the related art as well will be assigned the same reference signs and their explanations omitted.

Figure 2:
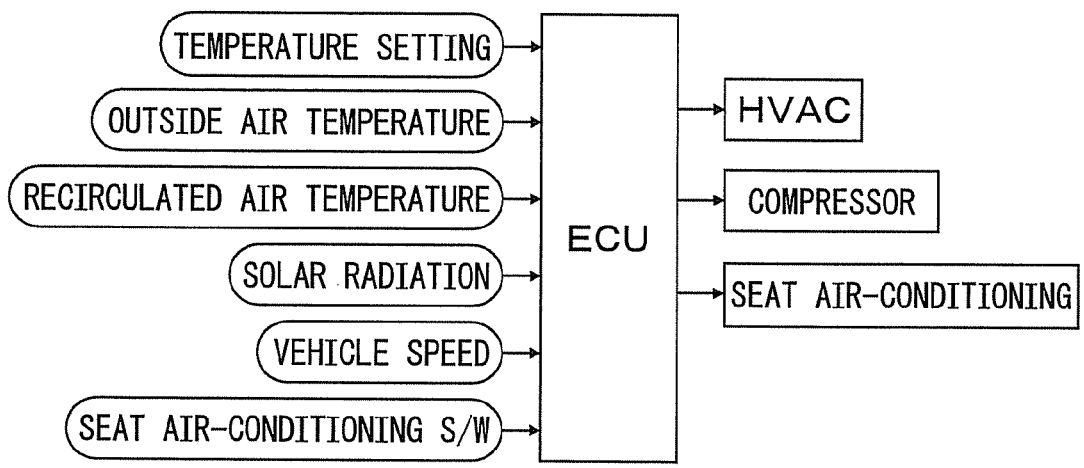
FIG. 2 is a block diagram which shows the system configuration of a vehicle air-conditioner and a seat air-conditioning unit of one example to which the present invention is applied.

FIG. 1 is a schematic view which shows, as one example to which the present invention is applied, the overall configuration of a vehicle air-conditioner (including air-conditioning unit HVAC) and a seat air-conditioning unit 5. FIG. 2 is a block diagram which shows, as one example to which the present invention is applied, the system configuration of a vehicle air-conditioner and a seat air-conditioning unit 5.

Each seat air-conditioning unit 5 is provided with a seat 3 comprised of a back part 3c and a seat part 3b, a fan 51 which is arranged in a space 6 which is formed at the bottom part of the seat 3, and a seat air-conditioning control device 37b and seat air-conditioning control panel 54 which control the fan 51.

The back part 3c is formed inside with a first duct 3e which communicates with the space 6. A plurality of air outlets 3a are formed communicating with the first duct 3e. The seat part 3b is formed inside with a second duct 3d which communicates with the space 6. A plurality of air outlets 3a are formed communicating with the second duct 3d.

The fan 51 guides recirculated air into the seat and blows it out toward the air outlets 3a. In the later explained Modification 4, a Peltier device or other electronic cooling device may be arranged in the space 6. In this case, the seat air-conditioning control device 37b controls the electronic cooling device. The seat air-conditioning unit to which the present invention is applied covers not the seat air-conditioning unit such as in Japanese Unexamined Patent Publication No. 2000-142095 which is communicated with an HVAC for blowing air, but a seat air-conditioning unit of a type which guides recirculated air to the inside of the seat 3 and blows it out toward air outlets 3a.

The seat air-conditioning control device 37b is provided with a seat air-conditioning control program which is preset in a built in ROM. It is electrically connected so as to enable not only operating information from the seat air-conditioning control panel 54, but also control information from the air-conditioning control means comprised of the air-conditioning control device 37 to be input and uses the operating information and control information as the basis to control the fan 51. The seat air-conditioning control panel 54 is provided with a seat air-conditioning switch etc. which start and stop the seat air-conditioning operation and perform other operations and is arranged at a position from which it can be operated by a passenger in a state sitting in the seat 3.

Next, the configuration of the air-conditioning unit 21 (HVAC) will be explained.

At the upstream side of a fan duct 22, outside air intake ports 23a, 23b which suck in air from outside the compartment (outside air) and recirculated air intake ports 24a, 24b which suck in air inside the compartment (recirculated air) are provided. The mixing ratio of the recirculated and outside air which are sucked in from the intake ports 23a, 23b, 24a, and 24b is switched by the inside/outside air doors 25a and 25b. The numbers of the intake ports of the outside air intake ports and recirculated air intake ports are not limited to the above illustrations and may be suitably set.

Inside the fan duct 22, a fan 26 is provided. At the downstream side of the fan 26, components forming part of the refrigeration cycle (not shown) such as an evaporator 28, air mix door 29, and heater core 30 through which engine cooling water is circulated are provided. As is well known, the opening degree of the air mix door 29 is adjusted to adjust the mixed ratio of the air which passes through the heater core 30 and the air which does not pass through it and thereby adjust the temperature of the conditioned air.

At the downstream side of the fan duct 22, a defrost opening 31 which is connected through a duct to a defroster outlet which blows conditioned air out toward the front windshield of the vehicle, a face opening 32 which is connected through a duct to face outlets which blow conditioned air out toward the upper bodies of passengers, and a foot opening 33 which is connected through a duct to foot outlets which blow conditioned air out toward the feet of passengers are provided. At the upstream sides of these openings 31, 32, and 33, control doors 34, 35, and 36 are provided.

The air-conditioning unit 21 is arranged at the inside from the instrumental panel at the front part of the compartment. The fan 51 and the seat air-conditioning control device 37b of each seat air-conditioning unit 5 are arranged inside of the seat 3 of the passenger. The air-conditioning control device 37a and the seat air-conditioning control device 37b are configured to be electrically connected. The air-conditioning control device 37a and the seat air-conditioning control device 37b will be referred to together as the "air-conditioning control devices".

The above configured air-conditioning unit 21 is controlled by the air-conditioning control device 37a. This air-conditioning control device 37a is provided with an air-conditioning control program which is preset in a built in ROM. It receives detection signals Tr, Tam, Ts, and Hu of detection operations from sensors for detecting a heat load of the vehicle such as a recirculated air temperature sensor 38, outside air temperature sensor 39, solar radiation sensor 40 for detecting the amount of solar radiation, and temperature sensor 41 and receives operating signals from the air-conditioning control panel 44 set inside of the instrument panel. Further, it runs the air-conditioning control program to control the operating mode, outlet mode, air outlet temperature, fan flow, etc. of the conditioned air which is blown out from the air-conditioning unit 21 to the compartment.

The air-conditioning control panel 44, as one example, as is well known, is provided with an A/C switch which turns the air-conditioning operation on and off, an auto switch which switches the operating mode between automatic and manual, five outlet mode switches which manually switch the outlets to "face", "bi-level", "foot", "foot defroster", and "defroster", an intake mode switch which manually switches the intake mode to outside air intake/recirculated air circulation, a fan switch which manually switches the fan air flow, and a temperature setting switch which manually sets the temperature setting becoming the target value of the air-conditioning control.

The auto switch is an operating switch which enables automatic control of switching of operating modes of the outlet mode switch, intake mode switch, and fan switch. When the operating signals are input to the air-conditioning control device 37a, the target blowing-out temperature TAO which was calculated based on the temperature setting which the passenger set and the recirculated air temperature Tr, outside air temperature Tam, and amount of solar radiation Ts which were detected by the recirculated air temperature sensor 38, outside air temperature sensor 39, and solar radiation sensor 40 is used as the basis to find the operating mode, air outlet temperature, fan air flow, and other control amounts of the conditioned air which is blown out from the air-conditioning unit 21 to the inside of the compartment. These are output as control information to the air-conditioning unit 21 for air-conditioning by the air-conditioning unit 21.

The control of the automotive air-conditioning and the hardware configuration of the system are not limited to the above example. The control which is described in the above-mentioned Automotive Air Conditioning, pp. 88 to 94, p. 93, FIG. 5.20 may also be applied.

Below, the basic technical idea forming the foundation of the present invention will first be explained.

Figure 3:
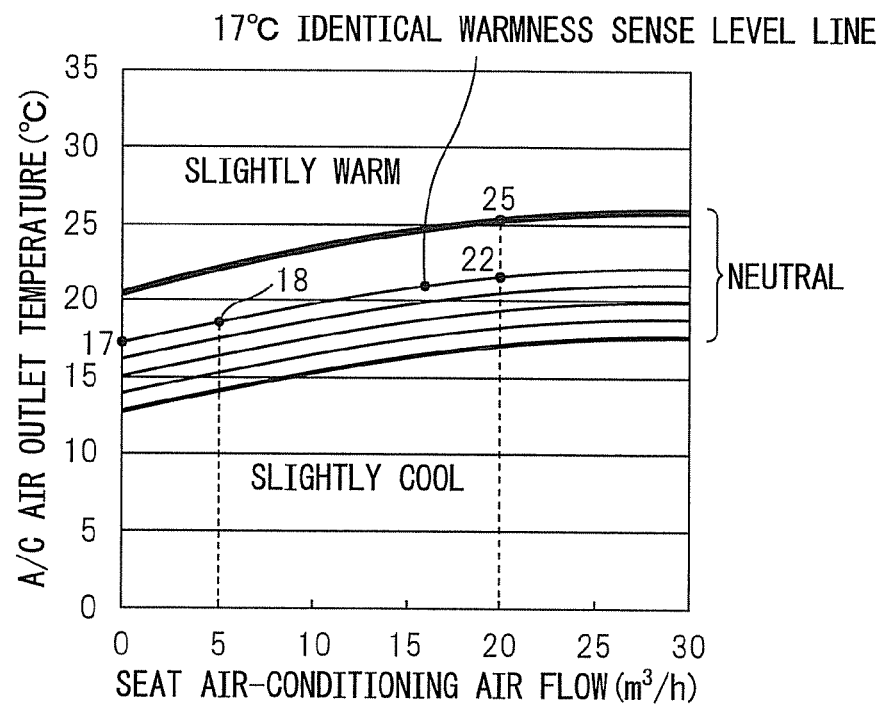
FIG. 3 is a general view of the effect of increase of the air outlet temperature which shows a relationship between an air flow of a seat air-conditioning unit and identical warmness sense level lines.

FIG. 3 is a general view of the effect of increase of the air outlet temperature which shows the relationship between the air flow of the seat air-conditioning unit and identical warmness sense level lines. This shows an example of the effect of raising the air outlet temperature by the seat air-conditioning. Here, the A/C (air-conditioning) air outlet temperature indicates the target blowing-out temperature (TAO, see above Automotive Air Conditioning, pp. 89 and 90). The target blowing-out temperature also means the target air outlet temperature.

Referring to FIG. 3, the point that by operating the seat air-conditioning at the time of cooling, the effect is obtained of the air outlet temperature rising will be explained. The abscissa shows the air flow of the seat air-conditioning (recirculated air sucked in and blown out by predetermined air flow), while the ordinate shows the air outlet temperature of the air-conditioner (target blowing-out temperature TAO). The top bold line shows the upper limit of the "neutral" region of the identical warmness sense level lines. The bottom bold line shows the lower limit of the "neutral" region of the identical warmness sense level lines. The "upper limit of the 'neutral' region", as shown in FIG. 3, is the boundary line between "slightly warm" and "neutral". The "lower limit of the 'neutral' region", as shown in FIG. 3, is the boundary line between "neutral" and "slightly cool".

Here, if explaining as one example an identical warmness sense level line of FIG. 3, at the time of a seat air-conditioning air flow of 0 ($m^3/h$), if the air outlet temperature is 17° C., the warmness sense level falls in the "neutral" region. At this time, if making the seat air-conditioning air flow 20 ($m^3/h$), even if the air outlet temperature is about 22° C., the warmness sense level can be made the "neutral" region (see identical warmness sense level line of 17° C. of FIG. 3). That is, by operating the seat air-conditioning, even if causing the air outlet temperature of the compartment air-conditioning to rise, it is possible to obtain the identical warmness sense level of 17° C. The air outlet temperature at the time of a seat air-conditioning air flow of 0 ($m^3/h$) was used to explain the identical warmness sense level line, but the distance between the upper limit and lower limit of the "neutral" region is divided in level into three layers or other parallel regions. It is also possible to decide on identical warmness sense level lines representing the same.

When the seat air-conditioning air flow is 20 ($m^3/h$), as seen in FIG. 3, the neutral region is entered before about 25° C. For this reason, even if making the air outlet temperature 25° C., the warmness sense level can still be made "neutral". While the same level is aimed at in terms of warmness sense level, if fuel economy is given priority to, there is no need to stick to 17° C. identical warmness sense level. The air outlet temperature can also be controlled while shifting to an identical warmness sense level line of another temperature within the "neutral" region above 17° C.

These results were first learned quantitatively as a result of R&D up to now.

If briefly touching upon the method of finding these identical warmness sense level lines, this is based on sensory analysis (evaluation by human subjects and thermal mannequins). That is, an identical warmness sense level line is set by changing the seat air flow and air outlet temperature and reporting the warmness sense level. Note that sensory analysis has already been established as a known means.

The results of FIG. 3 can be explained quantitatively as follows: The heat produced by the human body can be dissipated not only by the vehicle air-conditioner, but also from the seat part by seat air-conditioning (when seen from the human body), so even if reducing the vehicle air-conditioner capacity by that amount, it is believed that the warmness sense level becomes equal.

Whether it is possible to use an identical warmness sense level line such as in FIG. 3 to control the air outlet temperature in the compartment of a vehicle air-conditioner (HVAC unit) so as to reduce the amount of fuel consumption in a conventional vehicle other than at the time of normal driving (that is, at the time of stopping etc.) will be explained. In the winter, usually the cooling function is not used, so the present invention is effective at the time of use of the cooling function in the summer.

Explaining this in more detail by a flow chart, the thinking in control of the present embodiment is as follows: In the present embodiment, the vehicle air-conditioner is controlled based on the target blowing-out temperature (TAO) so as to control the air outlet temperature in the cabin, while the seat air-conditioning unit sucks recirculated air into the seat and controls at least the seat air-conditioning air flow per unit time for seat air-conditioning. At this time, when detecting that the vehicle speed is a predetermined value A or less, the system increases the seat air-conditioning air flow at that time (referred to as "reference seat air-conditioning air flow"), calculates a correction amount H from the target blowing-out temperature (TAO) shown by the point where the seat air-conditioning air flow which has been increased (referred to as "increased seat air-conditioning air flow") intersects the identical warmness sense level line, and uses this calculated correction amount H as the basis to correct the target blowing-out temperature (TAO). Of course, when detecting that the vehicle speed is a predetermined value A or less, it is also possible to increase the seat air-conditioning air flow Va and calculate the correction amount H of the target blowing-out temperature (TAO) considered neutral for the increased seat air-conditioning air flow. In this case, any temperature is possible so long as a target blowing-out temperature (TAO) which is included in the neutral region of FIG. 3.

An example of the case of the previously explained 17° C. identical warmness sense level line at the time of use of the cooling function in the summer will be explained next. For simplification, it is assumed that the seat air-conditioning is not operating and it is detected that the vehicle is in a stopped (or idling) state (or including a case where the vehicle speed is below a predetermined value A, for example, a predetermined value of 10 km/h or less, same below). The target blowing-out temperature (TAO) of the vehicle air-conditioner at this time is made 17° C. For the seat air-conditioning air flow of the seat air-conditioning unit, if detecting that the vehicle is stopped (or is idling), the seat air-conditioning air flow is automatically raised to 20 (m³/h) (the value is not limited to 20 (m³/h) and is suitably determined). When making the seat air-conditioning air flow 20 (m³/h), the 17° C. identical warmness sense level line is crossed at about 22° C., so the target blowing-out temperature (TAO) of 17° C. is increased by the correction amount 5° C. and the target blowing-out temperature (TAO) is controlled to 22° C. Due to this, thanks to the seat air flow, even if holding the target blowing-out temperature (TAO) high at 22° C., a passenger can feel the same warmness sense level of 17° C.

In this way, in the case of cooling, instead of holding the target blowing-out temperature (TAO) at 17° C., it is sufficient to hold a state of 22° C. which is 5° C. higher, so it is possible to lower the cooling ability. In conventional vehicles, there is no longer a need for "idling up control" at the time of idling and the amount of fuel consumption at the time other than driving (that is, when the vehicle is at a stop) can be reduced.

That is, the target blowing-out temperature+correction amount is replaced with the equivalent target blowing-out temperature (true target blowing-out temperature), the HVAC is controlled from this true target blowing-out temperature, and the compressor is controlled from the target evaporator outlet temperature. Originally, when not considering the seat air-conditioning air flow, the load on the compressor is large, but the target is set 5° C. higher, so the load becomes lighter and energy is saved.

As explained above, in a conventional vehicle where the engine is constantly operating, the issue is how to lower the fuel consumption. It is possible to lower the compressor drive force and broaden the region for operation of the compressor (COMP) without "idling up control" where the fuel consumption rises. Note that, if controlling the target evaporator outlet temperature as one example to be proportional to the target blowing-out temperature, a more reliable effect is obtained in lowering the fuel consumption.

In the above case, for explanation of the present embodiment, it was assumed that when detecting the vehicle was at a stop (or idling), the seat air-conditioning of the seat air-conditioning unit was not operating. When it is operating, the control becomes as follows:

When detecting that the vehicle is at a stop (or is idling), the target blowing-out temperature (TAO) is made 18° C. and the seat air-conditioning air flow (reference seat air-conditioning air flow) is made 5 (m³/h). If finding the identical warmness sense level line from FIG. 3, it is learned that in this case as well, it just happens to be on the 17° C. identical warmness sense level line. Usually, a predetermined identical warmness sense level line determined from the target blowing-out temperature (TAO) at the time the vehicle is stopped and the seat air-conditioning air flow (reference seat air-conditioning air flow) is selected. Further, if detecting that the vehicle is stopped (or idling), it is assumed that the seat air-conditioning air flow is automatically raised to 20 (m³/h). If making the seat air-conditioning air flow 20 (m³/h), the 17° C. identical warmness sense level line is crossed at 22° C., so the target blowing-out temperature (TAO) of 18° C. is increased this time by the correction amount 4° C. and the target blowing-out temperature (TAO) is controlled to 22° C.

The effect of increase of the air outlet temperature which is shown in FIG. 3 changes depending on the vehicle environment, so the effects of a plurality of conditions are set in advance, identical warmness sense level lines corresponding to inputs from the sensors of the air-conditioning system are prepared, and the lines are selectively used. For this reason, by mapping in advance the effect of increase of the air outlet temperature explained in FIG. 3, it is possible to easily calculate the raised temperature of the target blowing-out temperature (TAO) as the correction amount H in accordance with the current state of the seat air-conditioning (air flow is known from reference seat air-conditioning air flow and control voltage of fan).

That is, the present embodiment is an air-conditioning system where the vehicle air-conditioner has an air-conditioning unit (HVAC) and air-conditioning control devices (37a, 37b), the air-conditioning control devices (37a, 37b) are provided with at least a target blowing-out temperature calculating means for calculating a target blowing-out temperature (TAO), a correction amount calculating means for calculating a correction amount (H), a seat air-conditioning air flow judging means for detecting a seat air-conditioning air flow (Va) and setting an increased seat air-conditioning air flow, a vehicle speed judging means for judging if a vehicle speed is a predetermined value (A) or less, and a means for calculating a target evaporator outlet temperature from a target blowing-out temperature (TAO) and correction amount (H), and the seat air-conditioning air flow judging means and vehicle speed judging means are used to calculate the correction amount of the correction amount calculating means and the target evaporator outlet temperature is calculated from the target blowing-out temperature and the correction amount so as to thereby enable a reduction of the compressor operating rate.

The above effect of increase of the air outlet temperature can be found by a mathematical formula.

FIG. 4A and FIG. 4B are views showing the relationship between the seat air-conditioning air flow and the correction amount H.

As seen in FIG. 3, the identical warmness sense level lines of the different temperatures are, by experience, substantially parallel as a trend. Therefore, the curves in the graph shown in FIG. 4A may also be approximated by a mathematical formula. It is also possible to find and map in detail the numerical values for each temperature. Furthermore, to raise the calculation speed, it is also possible to approximate the identical warmness sense level lines for all temperatures as follows by a primary expression (line such as shown in FIG. 4B).

$$H = \alpha \cdot Va \quad \text{(formula 1)}$$

where,

H: correction amount (° C.)

α: constant (for example, 0.25)

Va: seat air-conditioning air flow (m$^3$/h)

Figure 5A:
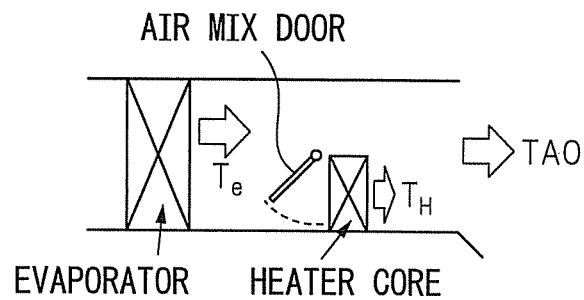
Figure 5B:
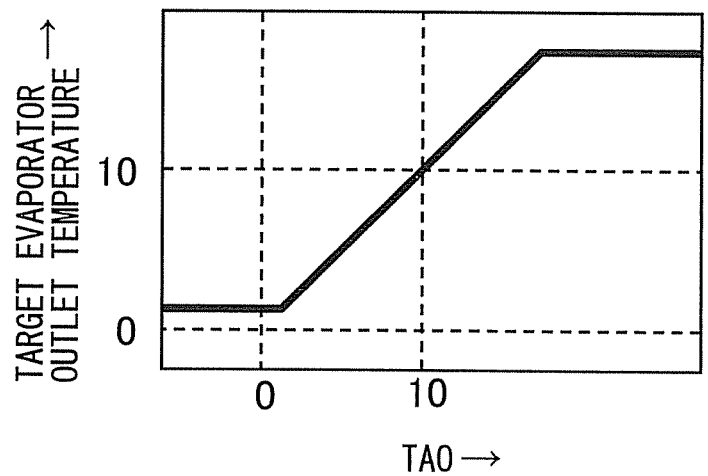
FIG. 5B is a view which shows a relationship between a target blowing-out temperature (TAO) and a target evaporator outlet temperature.

Next, the relationship between the target blowing-out temperature (TAO) and the target evaporator outlet temperature will be explained. FIG. 5A is a summary of the air outlet temperature control, while FIG. 5B is a view which shows the relationship between the target blowing-out temperature (TAO) and target evaporator outlet temperature. Note that, an outline of air outlet temperature control is given in the above Automotive Air Conditioning, so has been omitted here.

Here, as is well known, the target blowing-out temperature (TAO) is found as follows:

$$TAO = Kset \cdot Tset - Kr \cdot Tr - Kam \cdot Tam - Ks \cdot Ts + C$$

where,

Tset: temperature setting

Tr: compartment temperature

Tam: outside air temperature

Ts: solar radiation strength signal

Kset, Kr, Kam, Ks: gains of signals

C: constant

The temperature setting, outside air temperature, recirculated air temperature, and solar radiation are explained in Automotive Air Conditioning and other known vehicle air-conditioners, so explanations will be omitted.

In the same way as Japanese Unexamined Patent Publication No. 2006-76398, Automotive Air Conditioning, etc., in vehicle air-conditioner control (automotive air-conditioning), the heat load of a vehicle is sensed and the above formula is used to calculate the target blowing-out temperature (TAO).

From this target blowing-out temperature, the outlet mode of the HVAC and the air flow and air mix opening degree (A/M opening degree) are determined. The A/M opening degree is the mixing ratio of the heat exchanger (target evaporator outlet temperature T$_e$, heater core (H/C) temperature T$_H$). The opening degree is determined from the target evaporator outlet temperatures T$_e$ and T$_H$ (engine water temperature) to give the target blowing-out temperature (TAO). Therefore, in air-conditioning control of the HVAC unit, the target blowing-out temperature (TAO) and the target evaporator outlet temperature are controlled in relation to each other.

The target evaporator outlet temperature is determined by the frost, defogging, comfortable humidity, and TAO (as an example, the characteristic shown in FIG. 5B results from the frost, comfortable humidity, and TAO). The target blowing-out temperature (TAO) is used to determine the target evaporator outlet temperature. The compressor is controlled from the target evaporator outlet temperature, so if the target blowing-out temperature (TAO) rises, the load on the compressor becomes lighter and energy is saved.

Next, the seat air-conditioning switch will be explained. This switch (S/W) enables the air-conditioning ability of the seat air-conditioning to be changed by the passenger by his or her preference. At the very least, the switch is set to determine whether to operate the seat air-conditioning. This may be an OFF-ON two-stage switch or an OFF-Lo-Hi or other multistage switch or may be a switch enabling a linear change. These environmental conditions are input to the ECU and are processed inside the ECU, then the HVAC, compressor, seat air-conditioning, or other actuator is driven.

When "Lo" is 10 (m$^3$·h), "Mi" is 15 (m$^3$·h), and "Hi" is 20 (m$^3$·h), at the time of "Lo", by formula 1, the air outlet temperature can only be raised by H=0.25×10=2.5° C., but if changing this to 20 (m$^3$·h), it can be raised by up to 5° C., so it is possible to get the energy saving effect exerted to the maximum extent. Therefore, the correction amount is calculated from the current state of the seat air-conditioning switch, but if the current state of the switch position is not the maximum air flow, it is also possible to detect the idling state, then automatically make the seat air-conditioning maximum, then control the correction amount H to obtain the maximum effect. If explaining an example of this, when detecting that the vehicle is at a stop (or is idling), if the current state of the switch position is the "Lo" 10 (m$^3$·h), it is possible to make it the "Hi" 20 (m$^3$·h), determine the identical warmness sense level line from the value of the target blowing-out temperature (TAO) (or use formula 1) and control the air-conditioning to obtain the correction amount H. In this case, instead of the "Hi" 20 (m$^3$·h), it is also possible to employ the maximum value of 20 (m$^3$·h) or more.

When the seat air-conditioning switch is OFF, it is also possible to make the correction amount H "0" and not correct the air-conditioning, but if detecting the idling state (or including the case where the vehicle speed is below a predetermined value A, for example, a 10 km/h or less predetermined value), it is also possible to forcibly operate the seat air-conditioning. The predetermined value was made a 10 km/h or less predetermined value, but the invention is not limited to this. The predetermined value may also be suitably made 0 or 5 km/h or less. For the detection of the vehicle speed, there are many known arts in the area of control for correction of vehicle air-conditioners, so the method of detection will be omitted here.

Figure 6:
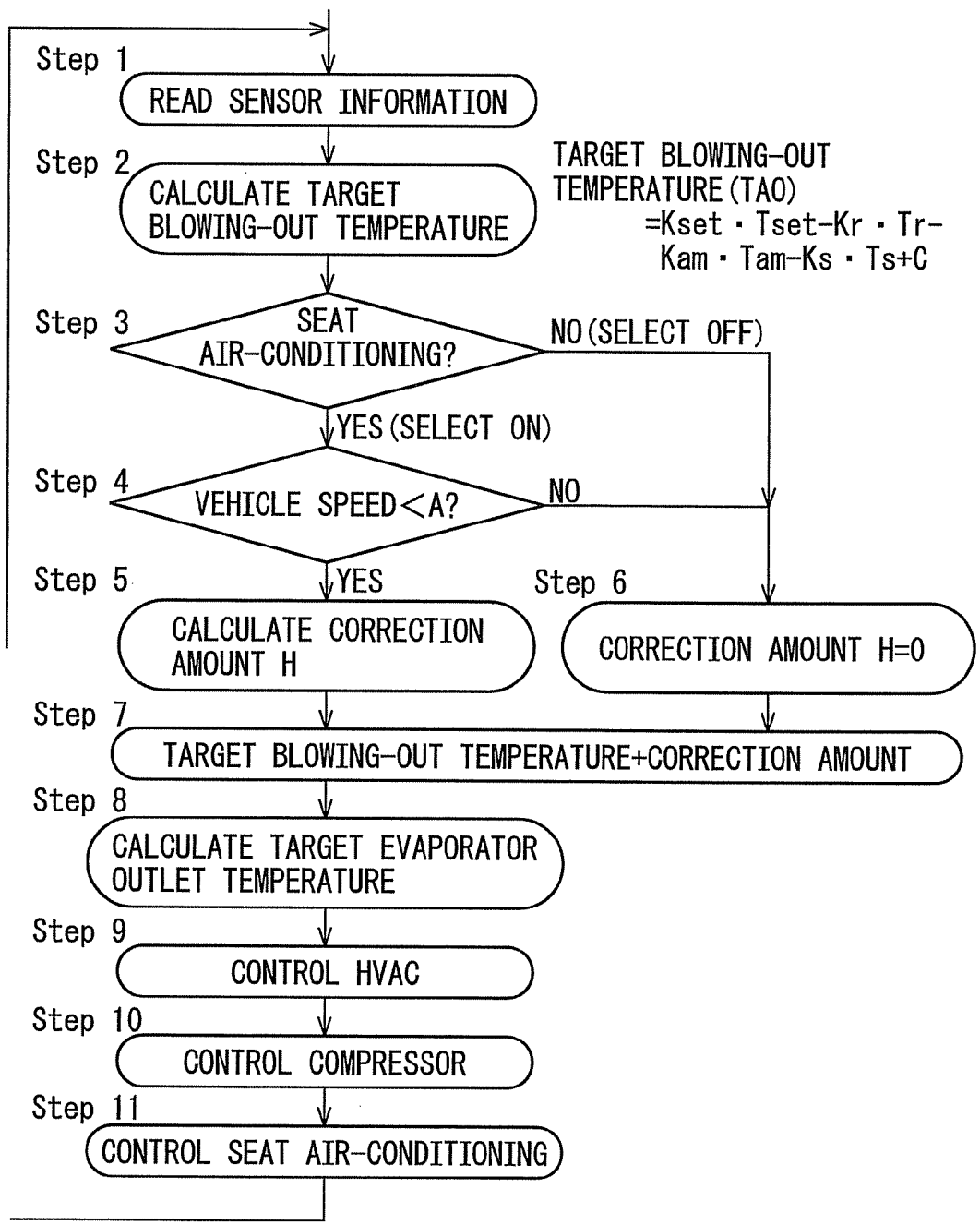
FIG. 6 is a general flow chart which shows an embodiment of the present invention.
Figure 7:
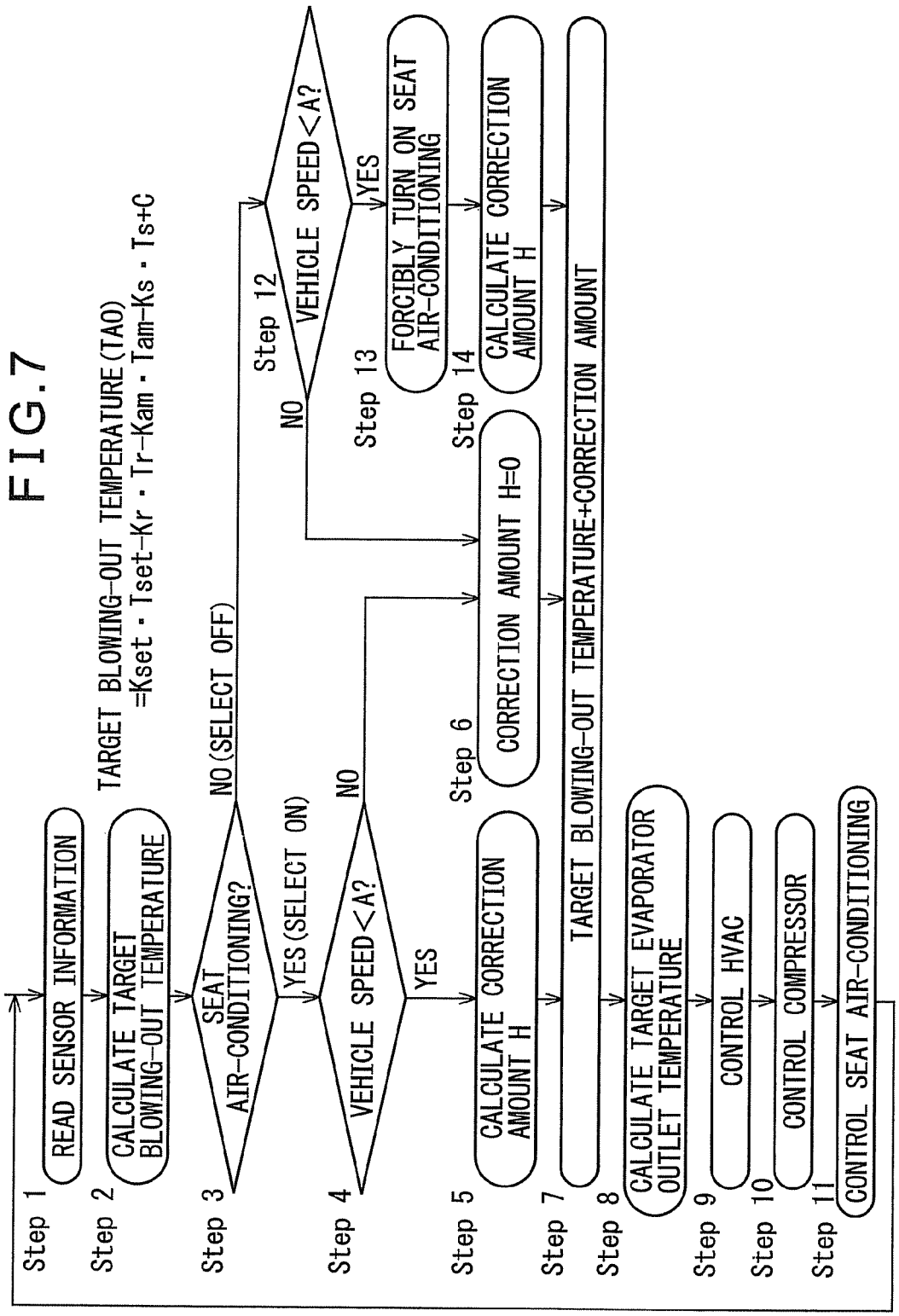
FIG. 7 is a general flow chart which shows another embodiment of the present invention.

FIGS. 6 and 7 are general flow charts which show embodiments of the present invention. Below, referring to FIG. 6, an outline of the flow of control of the system of one embodiment of the present invention will be explained.

At step 1, the sensor outputs and set conditions are input to the ECU (same as related art).

At step 2, the input conditions are used as the basis to calculate the target blowing-out temperature (TAO) (same as related art).

At step 3, it is judged if the seat air-conditioning switch is on. Here, if the seat air-conditioning switch is selected as off, the routine proceeds to step 6. If selected as on (including "Lo", "Hi", etc.), the routine proceeds to step 4.

At step 4, it is judged if the vehicle speed is under a predetermined value A (for example, a 10 km/h or less predetermined value) (vehicle is at a stop (or idling) or other such state). If Yes, the routine proceeds to step 5, while if No, the routine proceeds to step 6.

At step 5, it can be judged that the seat air-conditioning is operating and the vehicle is at a stop (or is idling), so this is a region where, without "idling up control", the load for operating the refrigeration cycle of the vehicle would be difficult and therefore the correction amount H is calculated.

Here, for example, when "Lo" is 10 ($m^3 \cdot h$), "Mi" is 15 ($m^3 \cdot h$), and "Hi" is 20 ($m^3 \cdot h$), if "Lo" is selected, the seat air-conditioning air flow (reference seat air-conditioning air flow) is set to the "Lo" of 10 ($m^3 \cdot h$) when it is detected that the vehicle has stopped (or is idling) or is in another such state. Simultaneously, the seat air-conditioning air flow to be increased is set to a predetermined air flow setting, for example, 20 ($m^3 \cdot h$), the identical warmness sense level line such as in FIG. 3 is selected from the target blowing-out temperature (TAO) calculated at step 2 and the reference seat air-conditioning air flow, and the selected identical warmness sense level line is used to find the target blowing-out temperature (TAO) at the air flow setting and calculate the correction amount H.

In this case, by mapping the effect of increase of the air outlet temperature which was explained in FIG. 3 in advance, it becomes possible to calculate the temperature able to be raised in accordance with the current state of seat air-conditioning (reference seat air-conditioning air flow) as the correction amount H. Of course, it is also possible to use formula 1 or another calculation formula for calculation.

At step 6, it can be judged that the seat air-conditioning is not operating, the air outlet temperature cannot be raised, or this is a region where "idling up control" is not required, so the correction amount H becomes 0.

At step 7, the system adds the target blowing-out temperature and correction amount and calculates the true target blowing-out temperature from the map of the target blowing-out temperature and target evaporator outlet temperature shown in FIG. 5B (Step 8).

In this way, the HVAC is controlled from the target blowing-out temperature, the compressor is controlled from the target evaporator outlet temperature, and the seat air-conditioning is controlled by a predetermined set air flow (or seat air-conditioning air flow to be increased) (step 9, step 10, and step 11).

By repeating the content of control which was explained up to here, it becomes possible to realize air-conditioning control and seat air-conditioning as in the past at the time the vehicle is being driven and to keep the warmness sense level equal while reducing the compressor drive power (operating rate) when the vehicle is not being driven (or is idling).

FIG. 7 shows a modification of FIG. 6. Only the points changed will be explained. The rest is similar to the earlier FIG. 6. In the case of FIG. 6, when the seat air-conditioning switch was OFF, the correction amount H was made 0 and the air-conditioning was not corrected, but after detecting the idling state, the seat air-conditioning was forcibly operated.

At step 3, if No, the routine does not immediately proceed to step 6, so at step 12, it is judged if the vehicle speed is under a predetermined value A (for example, 10 km/h or less predetermined value), that is, if the vehicle is at a stop (or is idling) or another such state. If No, the routine proceeds to step 6, while if Yes, the routine proceeds to step 13.

At step 13, the seat air-conditioning is forcibly turned on and a predetermined set air flow is used to control the seat air-conditioning air flow. In the same way as step 5, the correction amount H is calculated. The remainder is similar to the case of FIG. 6.

As other embodiments of the present invention, the following modifications may be considered.

Modification 1

In the embodiments which were explained up to here, the explanation was given based on the identical warmness sense level, but to give priority to the fuel economy, it is also possible to make the correction amount larger than the identical warmness sense level line which was explained in FIG. 3. As the method of for increasing the correction amount, it is possible to shift to an identical warmness sense level line of a predetermined higher temperature (within neutral region) to calculate the correction amount.

Modification 2

In the embodiments explained up to here, the correction amount is calculated from the current state of the seat air-conditioning switch, but when the current state of the switch position is not the maximum air flow, after detecting the idling state, it is also possible to automatically make the seat air-conditioning the maximum air flow ("Hi" or the higher "Max" value), then set the correction amount H to give the maximum effect in air-conditioning control. When the switch is used to set "Lo" or "Mi" other than the maximum ("Hi"), for example, when "Lo" is 10 ($m^3 \cdot h$), "Mi" is 15 ($m^3 \cdot h$), and "Hi" is 20 ($m^3 \cdot h$), at the time of "Lo", it is only possible to raise the air outlet temperature by $H=0.25 \times 10=2.5°$ C., but if changing this to 20 ($m^3 \cdot h$), the temperature is raised up to 5° C., so the energy saving effect can be exerted to the maximum.

Modification 3

The effect of increase of the air outlet temperature which is shown in FIG. 3 changes depending on the vehicle environment, so it is also possible to set in advance advantageous effects of a plurality of conditions and selectively use the conditions in accordance with inputs from sensors of the air-conditioning system.

Modification 4

The effect of increase of the air outlet temperature which is shown in FIG. 3 was explained with reference to a fan seat in which only air is only blown for seat air-conditioning, but seat air-conditioning also includes types where a heat exchanger (cooler) 52 (Peltier device etc.) is mounted, so it is also possible to set in advance a plurality of conditions including not only the air flow, but also the heat exchanger capacity and selectively use them in accordance with the air flow and heat exchanger capacity or air outlet temperature.

Figure 8:
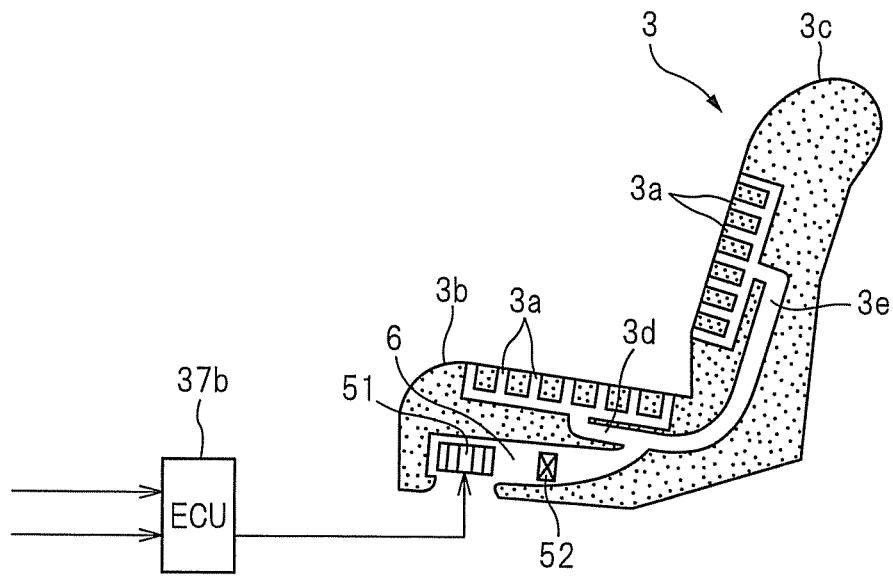
FIG. 8 is a view showing seat air-conditioning of a Modification 4.
Figure 9:
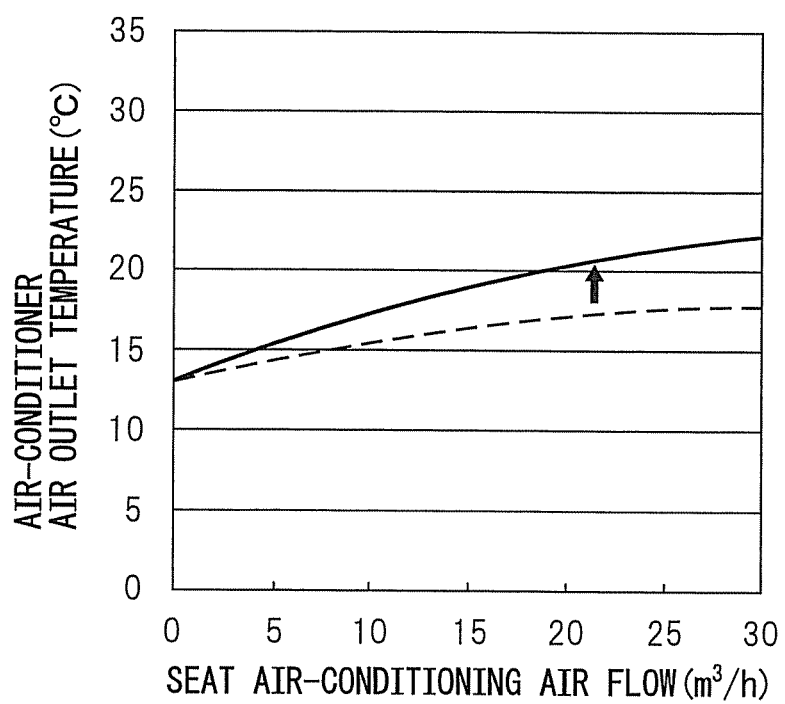
FIG. 9 is a view which shows a relationship between an air flow and identical warmness sense level line of a seat air-conditioning unit of the Modification 4.

FIG. 8 is a view which shows seat air-conditioning of Modification 4. FIG. 9 is a view which shows a relationship between an air flow of a seat air-conditioning unit and identical warmness sense level lines of Modification 4. In this case, the effect of increase of the air outlet temperature rises in accordance with an increase of the seat air-conditioning air flow (see broken line to solid line).

Modification 5

The air circulation method of seat air-conditioning was explained assuming a blowing out type, but a suction type is completely the same. In this case, the effect of increase of the air outlet temperature of FIG. 3 differs, so this has to be found by experiments.

While the invention has been described by reference to specific embodiments chosen for purposes of illustration, it should be apparent that numerous modifications could be made thereto by those skilled in the art without departing from the basic concept and scope of the invention.

The invention claimed is:

1. An air-conditioning system for a vehicle, the air-conditioning system comprising:
 a vehicle air-conditioner which uses a target blowing-out temperature as the basis to control an air outlet temperature, and
 a seat air-conditioning unit which sucks recirculated air into a seat and controls at least the seat air-conditioning air flow per unit time so as to perform seat air-conditioning,
 wherein the air-conditioning system increases said seat air-conditioning air flow when detecting that the vehicle is stopped or idling, calculates a correction amount for the target blowing-out temperature according to a calculated heat dissipated from the seat by the increased seat air-conditioning air flow, and uses said correction amount as the basis to correct said target blowing-out temperature so as to reduce an amount of fuel consumption at the time the vehicle is stopped or idling.

2. An air-conditioning system as set forth in claim 1, wherein
 said vehicle air-conditioner of said air-conditioning system has at least an evaporator, air mix door, HVAC unit which has a heater core, and refrigeration cycle device which operates a compressor to supply the evaporator with refrigerant and in that
 the system calculates a target evaporator outlet temperature of said evaporator from said target blowing-out temperature which has been corrected based on said correction amount so as to thereby reduce said compressor operating rate.

3. An air-conditioning system as set forth in claim 1, wherein said correction amount is determined by a map or a calculation formula.

4. An air-conditioning system as set forth in claim 1, wherein said seat air-conditioning unit is provided with a heat exchanger.

5. An air-conditioning system as set forth in claim 1, wherein said seat air-conditioning unit blows air to a passenger who is seated at a seat by blowing out or sucking in air.

6. An air-conditioning system for a vehicle, the air-conditioning system comprising:
 a vehicle air-conditioner which uses a target blowing-out temperature as the basis to control an air outlet temperature, and
 a seat air-conditioning unit which sucks recirculated air into a seat and controls at least the seat air-conditioning air flow per unit time so as to perform seat air-conditioning,
 wherein the air-conditioning system during a cooling process increases said seat air-conditioning air flow when detecting that the vehicle is stopped or idling, calculates a correction amount for the target blowing-out temperature according to a calculated heat dissipated from the seat by the increased seat air-conditioning air flow, and uses said correction amount as the basis to correct said target blowing-out temperature so as to reduce an amount of fuel consumption at the time the vehicle is stopped or idling.

7. An air-conditioning system as set forth in claim 6, wherein
 said vehicle air-conditioner of said air-conditioning system has at least an evaporator, air mix door, HVAC unit which has a heater core, and refrigeration cycle device which operates a compressor to supply the evaporator with refrigerant and in that
 the system calculates a target evaporator outlet temperature of said evaporator from said target blowing-out temperature which has been corrected based on said correction amount so as to thereby reduce said compressor operating rate.

8. An air-conditioning system as set forth in claim 6, wherein said correction amount is determined by a map or a calculation formula.

9. An air-conditioning system as set forth in claim 6, wherein a higher temperature is selected to thereby calculate the correction amount so that the correction amount becomes larger.

10. An air-conditioning system as set forth in claim 6, wherein
 said seat air-conditioning unit further comprises a switch for turning operation on and off and,
 when said switch is set at off and it is detected that the vehicle is stopped or idling, the system forcibly operates said seat air-conditioning unit and uses said correction amount as the basis to correct said target blowing-out temperature.

11. An air-conditioning system as set forth in claim 10, wherein
 said switch is provided with switch positions for setting said seat air-conditioning air flow in stages and,
 when said switch position sets said seat air-conditioning air flow to a maximum air flow or less and the system detects the vehicle is stopped or idling, the system forcibly makes said seat air-conditioning air flow the maximum air flow and uses said correction amount as the basis to correct said target blowing-out temperature.

12. An air-conditioning system as set forth in claim 6, wherein said seat air-conditioning unit is provided with a heat exchanger.

13. An air-conditioning system as set forth in claim 6, wherein said seat air-conditioning unit blows air to the passenger who is seated at a seat by blowing out or sucking in air.

* * * * *